United States Patent
Nota et al.

(10) Patent No.: US 10,684,120 B2
(45) Date of Patent: Jun. 16, 2020

(54) WIRE ROPE MEASURING DEVICE AND WIRE ROPE MEASURING METHOD

(71) Applicants: Meidensha Corporation, Tokyo (JP); Otis Elevator Company, Farmington, CT (US)

(72) Inventors: Yoshiki Nota, Tokyo (JP); Yusuke Watabe, Tokyo (JP); Mitsuru Kato, Inzai (JP); Ryuji Onoda, Chiba (JP); Hirotomo Tanaka, Chiba (JP); Takashi Takeuchi, Tokyo (JP)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/465,033

(22) PCT Filed: Nov. 29, 2017

(86) PCT No.: PCT/JP2017/042733
§ 371 (c)(1),
(2) Date: May 29, 2019

(87) PCT Pub. No.: WO2018/101297
PCT Pub. Date: Jun. 7, 2018

(65) Prior Publication Data
US 2020/0003549 A1 Jan. 2, 2020

(30) Foreign Application Priority Data
Nov. 29, 2016 (JP) ................................. 2016-230838

(51) Int. Cl.
*G01B 11/08* (2006.01)
*G01B 11/245* (2006.01)
*G01B 11/25* (2006.01)

(52) U.S. Cl.
CPC ............ *G01B 11/08* (2013.01); *G01B 11/245* (2013.01); *G01B 11/2545* (2013.01)

(58) Field of Classification Search
CPC ... G01B 11/08; G01B 11/2545; G01B 11/245; G01B 11/10
See application file for complete search history.

(56) References Cited

U.S. PATENT DOCUMENTS

2009/0217954 A1* 9/2009 Hall ........................ B08B 9/023
134/115 R
2019/0063904 A1* 2/2019 Rossini .............. G01B 11/2433

FOREIGN PATENT DOCUMENTS

EP 2772724 A1 9/2014
JP 4370471 B2 11/2009
(Continued)

OTHER PUBLICATIONS

DXO Labs, "User Guide DxO ViewPoint—Shift Your Experience", DXO Image Science, Dec. 31, 2012, pp. 1-29.
(Continued)

*Primary Examiner* — Howard D Brown, Jr.
(74) *Attorney, Agent, or Firm* — Cantor Colburn LLP

(57) ABSTRACT

A wired-rope measuring device, provided with two cameras 1, 2 that shoot one or no less than two wired ropes 8 from different directions and an analyzing device 5 that analyzes image data that is an image shot by the two cameras 1, 2, wherein the analyzing device 5 applies the principle of triangulation by a stereo method to the image data to seek a center coordinate $P_0$ of the wired rope 8 relative to the cameras 1, 2 and volumetric anamorphosis is corrected when calculating a diameter D of the wired rope 8 based on the center coordinate $P_0$ of the wired rope 8.

6 Claims, 4 Drawing Sheets

(56) References Cited

FOREIGN PATENT DOCUMENTS

| JP | 5413096 B2 | 2/2014 |
|----|------------|--------|
| JP | 5413148 B2 | 2/2014 |
| JP | 5428798 B2 | 2/2014 |
| JP | 5446849 B2 | 3/2014 |

OTHER PUBLICATIONS

International Search Report and Written Opinion for application PCT/JP2017/042733, dated Feb. 9, 2018, 14 pages.

* cited by examiner

[Fig. 1]
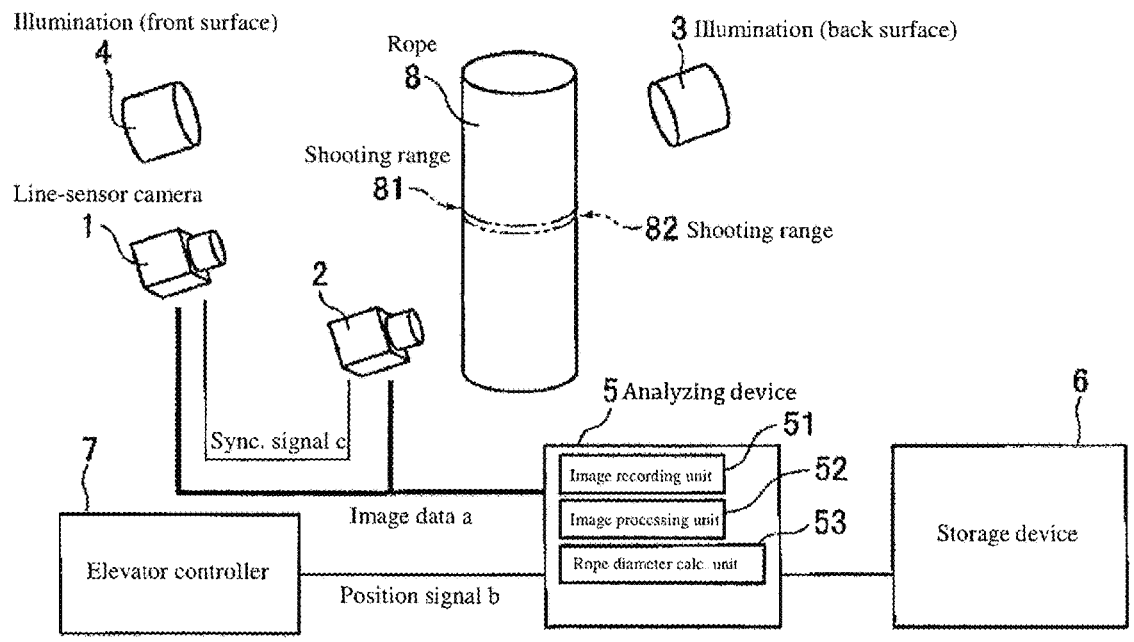
[Fig. 2]
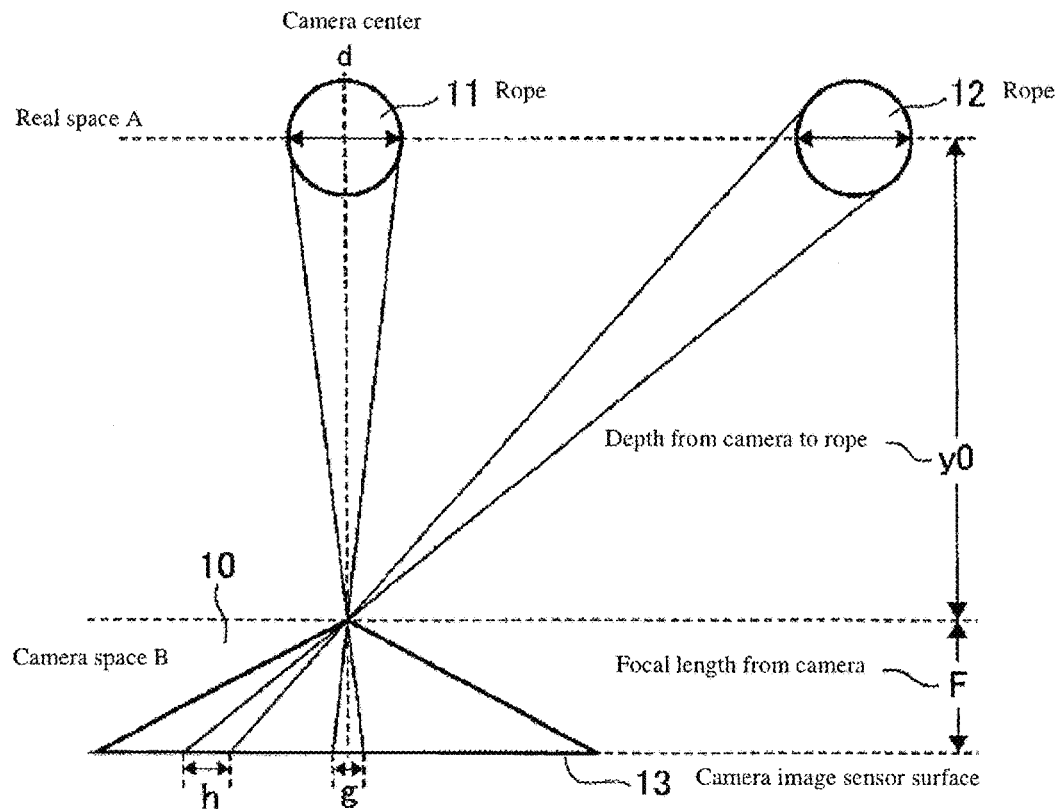

[Fig. 3]
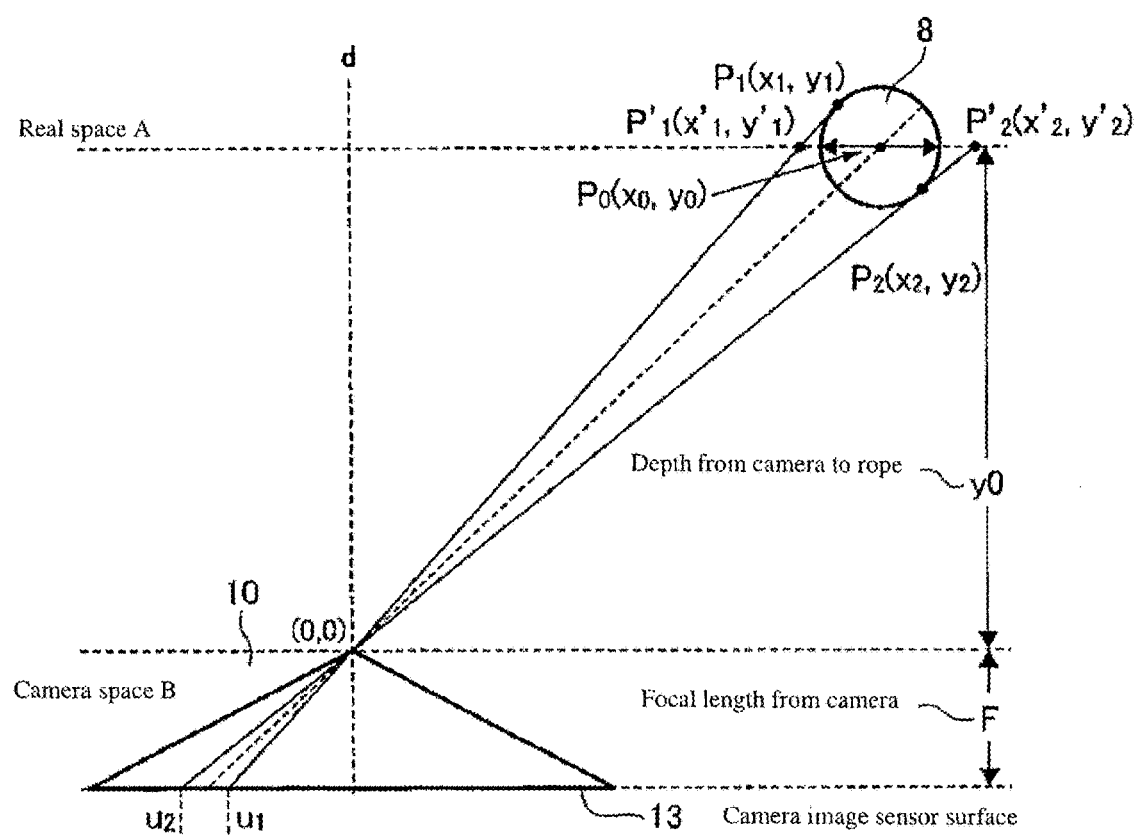

[Fig. 4]
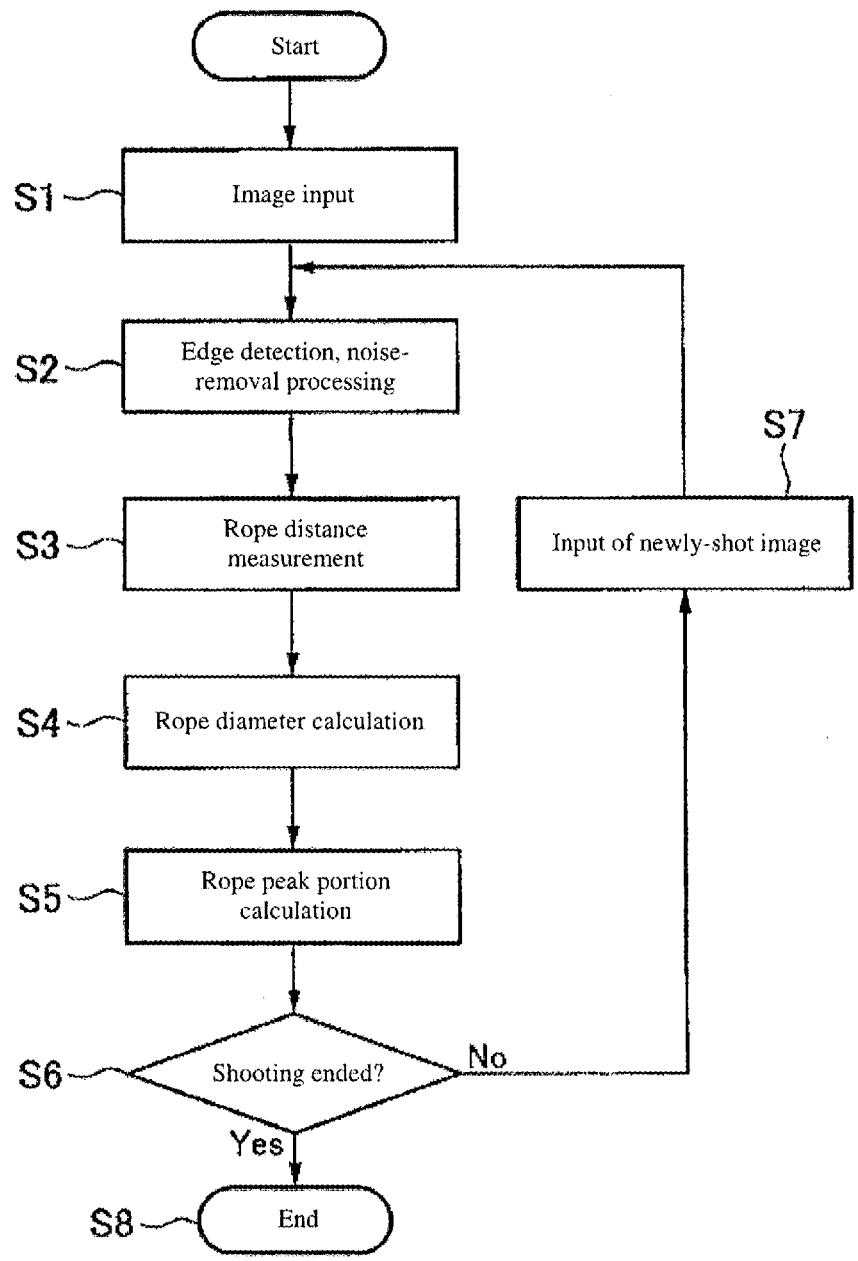

[Fig. 5]
(a) Input of rope shooting image
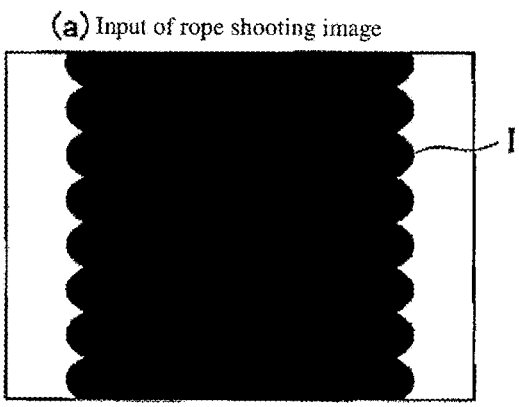
(b) Detection of rope outer diameter portion
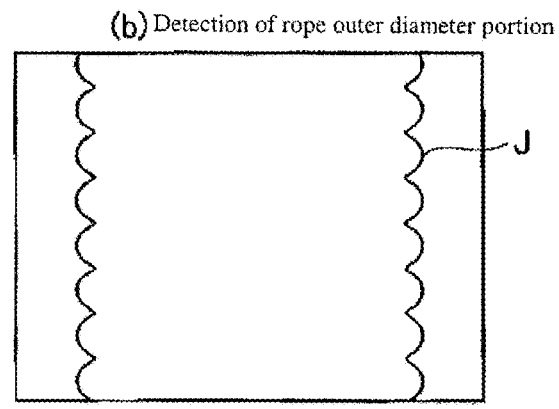
(c) Conversion into rope diameter value
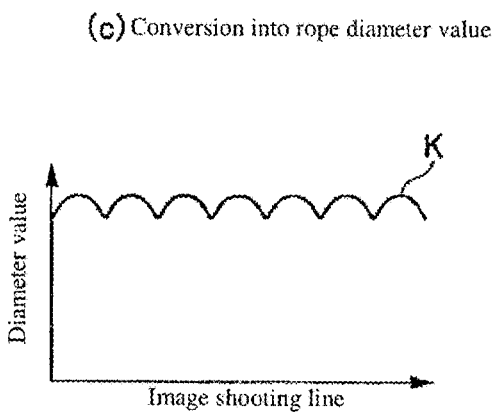
(d) Detection of rope peak portion
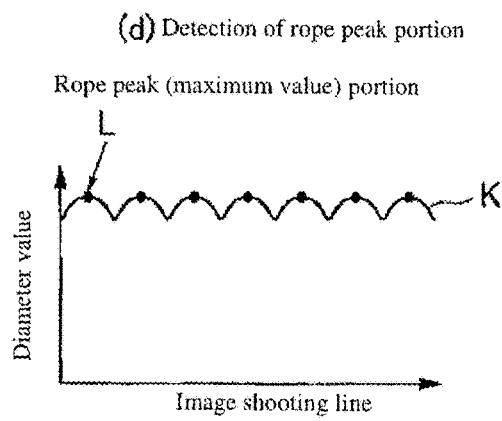

WIRE ROPE MEASURING DEVICE AND WIRE ROPE MEASURING METHOD

TECHNICAL FIELD

The present invention relates to a wired-rope measuring device and method. It particularly relates to a technique of measuring a diameter of a rope without contact by analyzing image data where a rope in a vicinity of an elevator winch is shot by a line-sensor camera.

BACKGROUND ART

Patent literature 1 discloses using an area camera, patent literature 2 discloses using a projector, and patent literature 3 discloses measuring a rope diameter using a line sensor.

CITATION LIST

Patent Literature

[PLT 1] JP 5446849 B2
[PLT 2] JP 4370471 B2
[PLT 3] JP 5769875 B2

SUMMARY OF INVENTION

Technical Problem

However, because patent literature 1 is premised on using an area camera, a measurement resolution of a rope diameter is less favorable compared to a line-sensor camera. Moreover, because vibration is not considered, measurement is impossible in a situation where, due to vibration or the like of the rope, a distance from the camera to the rope is changed from when measuring is started.

Patent literature 2 is extremely costly because a projector is necessary for each rope.

With patent literature 3, because a conversion coefficient for each pixel is calculated in advance in converting from an image processing result to an actual size, in a situation where a distance between a camera and a rope is fluctuated due to vibration or the like of the rope, the conversion coefficient must be reset.

Solution to Problem

A wired-rope measuring device according to claim 1 of the present invention that solves the above problems is a wired-rope measuring device, provided with two cameras that shoot one or no less than two wired ropes from different directions and an analyzing device that analyzes image data that is an image shot by the two cameras, wherein the analyzing device applies the principle of triangulation by a stereo method to the image data to seek coordinates of the wired rope relative to the cameras and volumetric anamorphosis is corrected when calculating a diameter of the wired rope based on the coordinates of the wired rope.

A wired-rope measuring device according to claim 2 of the present invention that solves the above problems is the wired-rope measuring device according to claim 1, further provided with at least one illumination instrument that illuminates the wired rope.

A wired-rope measuring device according to claim 3 of the present invention that solves the above problems is the wire-rope measuring device according to claim 1 or 2, wherein the analyzing device corrects volumetric anamorphosis by seeking two projection points where an outer diameter of the wired rope is projected to an image sensor surface of the cameras, seeking two lines that pass through the projection points and a focal point of the cameras as lines touching the outer diameter of the wired rope, seeking two perpendicular lines that are perpendicular to the lines and pass through a center of the wired rope, calculating distances from points where the lines touch the outer diameter of the wired rope to the center of the wired rope as lengths of the perpendicular lines, and calculating the diameter of the wired rope with a sum of the lengths of the perpendicular lines.

A wired-rope measuring method according to claim 4 of the present invention that solves the above problems is a wired-rope measuring method, provided with the steps of shooting by two cameras one or no less than two wired ropes from different directions, seeking coordinates of the wired rope relative to the cameras by the principle of triangulation by a stereo method by analyzing image data that is a shot image, and correcting volumetric anamorphosis when calculating a diameter of the wired rope based on the coordinates of the wired rope.

A wired-rope measuring method according to claim 5 of the present invention that solves the above problems is the wired-rope measuring method according to claim 4, wherein the wired rope is illuminated by at least one illumination instrument.

A wired-rope measuring method according to claim 6 of the present invention that solves the above problems is the wired-rope measuring method according to claim 4 or 5, wherein correcting volumetric anamorphosis is performed by seeking two projection points where an outer diameter of the wired rope is projected to an image sensor surface of the cameras, seeking two lines that pass through the projection points and a focal point of the cameras as lines touching the outer diameter of the wired rope, seeking two perpendicular lines that are perpendicular to the lines and pass through a center of the wired rope, calculating distances from points where the lines touch the outer diameter of the wired rope to the center of the wired rope as lengths of the perpendicular lines, and calculating the diameter of the wired rope with a sum of the lengths of the perpendicular lines.

Advantageous Effects of Invention

By using two cameras_a so-called stereo camera_to shoot one or no less than two wired ropes from different directions and analyzing image data that is a shot image, the present invention seeks coordinates of a wired rope relative to the stereo camera (including a distance between the camera and the wired rope) by the principle of triangulation by a stereo method and exhibits an effect where volumetric anamorphosis can be automatically corrected when calculating a diameter of the wired rope based on the sought coordinates of the wired rope.

Moreover, unlike a conventional invention where a conversion coefficient from an image to an actual size is calculated, the present invention enables measurement of the diameter of the wired rope without seeking such a conversion coefficient. This is also the case in a situation where the wired rope vibrates or fluctuates in position, where measurement is conventionally impossible.

Moreover, unlike a conventional invention where a projector is necessary for each rope, the present invention can measure a plurality of vibrating wired ropes using at least one illumination instrument on the plurality of wired ropes.

BRIEF DESCRIPTION OF DRAWINGS

FIG. 1 A device configuration diagram illustrating a wired-rope diameter measuring device of the present invention.

FIG. 2 An explanatory diagram of volumetric anamorphosis.

FIG. 3 An explanatory diagram of volumetric-anamorphosis correction.

FIG. 4 A flowchart illustrating a wired-rope diameter measuring method according to example 1 of the present invention.

FIG. 5 An explanatory diagram of each step in the wired-rope diameter measuring method according to example 1 of the present invention.

DESCRIPTION OF EMBODIMENTS

A device configuration of the present invention is illustrated in FIG. 1.

FIG. 1 illustrates a wired-rope diameter measuring device installed in a vicinity of an elevator winch.

As illustrated in FIG. 1, as one embodiment, a wired-rope diameter measuring device of the present invention is provided with two line-sensor cameras ("cameras") 1, 2; a background illumination (instrument) 3; a front illumination (instrument) 4; and an analyzing device 5.

The cameras 1, 2 shoot an elevator rope ("rope") 8 from different directions; the background illumination 3 illuminates the rope 8 from a back surface, and the front illumination 4 illuminates the rope 8 from a front surface.

In the diagram, a shooting range 81 where the rope 8 is shot by the camera 1 is indicated by the dot-dash line and a shooting range 82 where the rope 8 is shot by the camera 2 is indicated by the dot-dot-dash line; in this manner, these shooting ranges overlap and are in a direction of cutting the rope 8 at a horizontal cross section.

In the diagram, as an example, one rope 8 is illustrated; however, at the elevator winch, a plurality of ropes 8 can be shot by the cameras 1, 2. As long as the shooting ranges of the cameras 1, 2 can be illuminated, the background illumination 3 or the front illumination 4 can be omitted. Whereas in patent literature 2 a projector is necessary for each rope, in the present invention, the plurality of ropes 8 can be illuminated using one illumination, the background illumination 3 or the front illumination 4.

The analyzing device 5 is a device that analyzes image data that is an image shot by the cameras 1, 2 and is particularly a device that applies the principle of triangulation by a stereo method to image data a shot by the cameras 1, 2 to seek coordinates of the rope 8 relative to the cameras 1, 2 and, based on the sought coordinates of the rope 8, calculates a diameter of the rope 8 and corrects volumetric anamorphosis.

The analyzing device 5 is provided with an image recording unit 51, an image processing unit 52, and a rope diameter calculation unit 53. As the analyzing device 5, a general personal computer can be used, and the image recording unit 51, the image processing unit 52, and the rope diameter calculation unit 53 can be realized by software. A storage device 6 accompanies the analyzing device 5.

The image shot by the cameras 1, 2 is input as the image data a to the analyzing device 5 and stored in the storage device 6 by the image recording unit 51. The storage device 6 also saves various data necessary for processing by the image processing unit 52 and the rope diameter calculation unit 53.

As described below, the image processing unit 52 performs edge detection and noise-removal processing on the image data a that is the image shot by the cameras 1, 2.

As described below, the rope diameter calculation unit 53 is a device that calculates the rope diameter by performing various types of processing, including volumetric-anamorphosis correction, on the image data a for which edge detection and noise-removal processing are performed.

A position signal b of an elevator (not illustrated) is input to the analyzing device 5 by an external input such as an elevator controller 7, and a position of the elevator and shooting lines of the cameras 1, 2 are synchronized. A synchronization signal c is sent and received between the cameras 1, 2.

As described above, while there are several methods of measuring the elevator rope without contact, the present invention provides a measuring device of a stereo-camera method by the line-sensor cameras 1, 2.

By using the line-sensor cameras 1, 2 as measuring instruments, the plurality of elevator ropes 8 can be measured at once by one camera 1 or 2; more precise measurement is possible compared to patent literature 1, which uses an area camera, because superiority is also had in terms of resolution and shooting cycle.

A method of measuring a diameter of an elevator rope using a camera is also proposed conventionally. Patent literature 3 performs diameter measurement of a rope using an area camera and a line-sensor camera and is related to the present invention in that cameras are used.

However, patent literature 3 must calculate in advance conversion coefficients in pixel units for converting a result of image processing into an actual size.

In a situation of calculating conversion coefficients in advance in this manner, the conversion coefficients change each time a distance between the cameras and the rope fluctuates due to elevator-rope vibration or the like, which makes measurement impossible.

Furthermore, because a measurement target at an edge of an image is shot larger due to the volumetric anamorphosis in FIG. 2, which is a camera characteristic, there is also a problem where no unique conversion coefficient can be established.

With regard to these problems, the present invention measures the coordinates of the rope 8 relative to the cameras 1, 2 (including a two-dimensional distance therebetween) by the two line-sensor cameras 1, 2 and uses this measurement value to automatically correct volumetric anamorphosis_in other words, automatically and sequentially calculates coefficients for conversion from an image processing result into an actual size.

Moreover, because normally a rope diameter is managed according to a peak portion of the rope, it is desirable to also detect a peak of the rope from the image.

First, a method of correcting volumetric anamorphosis is described below as a theoretical formula.

<Method of Correcting Volumetric Anamorphosis>

As illustrated in FIG. 2, volumetric anamorphosis is a phenomenon occurring in a situation where a camera 10 is used to shoot ropes 11, 12 or the like; it is a phenomenon where, in a situation where the ropes 11, 12, which are measurement targets with the same diameter in a real space A, are shot at an image-sensor surface 13 in a camera space (referring to a space in the camera 10) B, the rope 12, which is at an edge of an image, is measured thicker than the rope 11, which is positioned at a camera center d.

That is, it is a phenomenon where, in the situation where in the real space A the rope 11 positioned at the camera center d and the rope 12 positioned at the edge of the image have the same diameter, a size h that the rope 12 positioned at the edge of the image has projected to the image sensor surface 13 in the camera space B is measured as greater (thicker) than a size g that the rope 11 positioned at the camera center d has projected to the image sensor surface 13 in the camera space B.

As illustrated in FIG. 3, the method of correcting volumetric anamorphosis is described below focusing on the rope 8 present in the real space A.

Formulas (1), (2) below are linear equations from rope projection points $u_1$, $u_2$ on the image sensor surface 13 of the camera 10 to rope outer diameter points $P_1$ ($x_1$,$y_1$), $P_2$ ($x_2$,$y_2$), which are measurement targets.

[Math.1]

$$y = \frac{F}{u_1}x \quad (1)$$

$$y = \frac{F}{u_2}x \quad (2)$$

In formulas (1), (2), F is a focal length of the camera and $u_1$, $u_2$ are distances from the camera center d in a horizontal direction (x-axis direction) in the diagram; both linear equations pass through a focal point (0,0).

That is, because the rope projection points $u_1$, $u_2$ are the rope outer diameter points $P_1$ ($x_1$, $y_1$), $P_2$ ($x_2$,$y_2$) projected to the image sensor surface 13 of the camera 10, as indicated in formulas (1), (2), seeking linear equations that pass through the rope projection points $u_1$, $u_2$ and the rope outer diameter points $P_1$ ($x_1$,$y_1$), $P_2$ ($x_2$,$y_2$) is the same as seeking linear equations connecting the rope projection points $u_1$, $u_2$ and the focal point (0,0).

Next, using formulas (1), (2) above, points where the rope outer diameter points $P_1$, $P_2$ are converted into positions at a height (a depth in a y-axis direction from the camera 10 to the rope 8) $y_0$ are defined as P'$_1$ (x'$_1$,y'$_1$), P'$_2$ (x'$_2$,y'$_2$). From the points P'$_1$, P'$_2$, a rope center coordinate $P_0$ ($x_0$,$y_0$) can be calculated using formula (3) below. y'$_1$=y'$_2$=$y_0$, and the rope center coordinate $P_0$ is defined as the midpoint of points P'$_1$, P'$_2$.

[Math.2]

$$x_0 = \frac{u_1 + u_2}{2F}y_0 \quad (3)$$

At this time, lines that are perpendicular to the lines of formulas (1), (2) and pass through the rope outer diameter points $P_1$, $P_2$ can be calculated respectively by formulas (4), (5) below. Both formulas (4), (5) pass through the rope center coordinate $P_0$.

That is, sought are two perpendicular lines that are perpendicular to the lines indicated by formulas (1), (2) and pass through the rope center coordinate $P_0$.

[Math.3]

$$y = -\frac{u_1}{F}(x - x_0) + y_0 \quad (4)$$

$$y = -\frac{u_2}{F}(x - x_0) + y_0 \quad (5)$$

Respectively substituting formulas (1), (2) into formulas (4), (5), the rope outer diameter points $P_1$ ($x_1$, $y_1$), $P_2$ ($x_2$,$y_2$) can be calculated as formulas (6), (7) below.

[Math.4]

$$x_1 = \frac{x_0 + a_1 y_0}{a_1^2 + 1}, \, y_1 = a_1 x_1, \, a_1 = \frac{F}{u_1} \quad (6)$$

$$x_2 = \frac{x_0 + a_2 y_0}{a_2^2 + 1}, \, y_2 = a_2 x_2, \, a_2 = \frac{F}{u_2} \quad (7)$$

A rope diameter D where volumetric anamorphosis is corrected by the formulas below can be calculated by formula (8) below.

$$D = d_1 + d_2 \quad [\text{Math.5}]$$

$$d_1 = \sqrt{(x_0 - x_1)^2 + (y_0 - y_1)^2}$$

$$d_2 = \sqrt{(x_0 - x_2)^2 + (y_0 - y_2)^2} \quad (8)$$

That is, as indicated in the second equation and the third equation of formula (8), as lengths $d_1$, $d_2$ of the two perpendicular lines, respectively calculated are distances from the outer diameter points $P_1$, $P_2$ where the lines indicated by formulas (1), (2) touch the rope 8 to the rope center coordinate $P_0$.

Moreover, as indicated in the first equation in formula (8), the diameter D of the rope 8 is calculated with a sum of the lengths $d_1$, $d_2$ of the perpendicular lines.

Here, the focal length F of the camera 10 and the height $y_0$, which is the depth from the camera 10 to the rope 8, are already known and the rope center coordinate $P_0$ is sought by applying the principle of triangulation by a stereo method. Moreover, the rope projection points $u_1$, $u_2$ on the image sensor surface 13 of the camera 10 are measured by the camera 10. Moreover, $a_1$, $a_2$, $x_1$, $y_1$, $x_2$, and $y_2$ are also sought by calculation by formulas (6), (7).

Example 1

An example of the present invention is described below with reference to a flowchart illustrated in FIG. 4.

The present example calculates a rope diameter with a rope diameter measuring device consisting of the device configuration illustrated in FIG. 1.

Steps of the present invention are carried out as below based on FIG. 4.

First, an image shot by cameras 1, 2 is input as image data to an analyzing device 5 (step S1).

Next, edge detection and noise-removal processing are performed on the input image data by an image processing unit 52 of the analyzing device 5 (step S2).

Next, rope distance measurement (step S3), rope diameter calculation (step S4), and rope peak portion calculation (step S5) are performed on the image data for which edge detection and noise-removal processing are performed by a rope diameter calculation unit 53 of the analyzing device 5.

Afterward, whether shooting is ended is determined by the analyzing device 5 (step S6); if shooting is not ended, a newly-shot image is input (step S7) and step S2 to step S5 are repeated, and if shooting is ended, the flow is ended (step S8).

Each step is as below.

<Step S1: Image Input>

As illustrated in (a) in FIG. 5, the image shot by the cameras 1, 2 is input as the image data to the analyzing device 5. In (a) in FIG. 5, a boundary between an inner side of the rope 8, filled in with black, and an outer side of the rope 8, filled in with white, is an outer diameter I of the rope 8.

Here, by fluctuating a camera shooting cycle using position information acquired from an elevator controller 7, shooting is possible with a constant shooting pitch of the rope 8.

Input are images of the two cameras 1, 2 where shooting is performed with this constant pitch.

<Step S2: Edge Detection, Noise-Removal Processing>

As illustrated in (b) in FIG. 5, the outer diameter (edge) of the rope 8 is detected from the input images. In (b) in FIG. 5, the boundary between the inner side of the rope 8 and the outer side of the rope 8 is detected as an edge J of the rope 8.

Here, by performing edge detection at a subpixel precision using parabola fitting as a means of detecting the edge of the rope 8, the outer diameter of the rope can be detected at a higher precision than normal edge detection.

At this time, removal of shooting noise included in the edge is also performed using a moving-average method on the calculated edge.

<Step S3: Rope Distance Measurement>

Center coordinates of the rope 8, which are a measurement target, are calculated from a rope outer diameter detection result of the images of the cameras 1, 2, left and right, and a distance from the cameras to a rope center, which is a target, is measured by the principle of triangulation using internal and external parameters of the cameras sought in advance by calibration.

<Step S4: Rope Diameter Calculation>

Measurement of the diameter of the rope 8 is performed using the outer diameter of the rope 8 detected at step S2 and information on the distance to the rope measured at step S3. In regard to this, as already described based on FIG. 3, volumetric anamorphosis is corrected at this time. A simplified description is repeated below.

First, sought are rope projection points $u_1$, $u_2$ where outer diameter points $P_1$, $P_2$ of the rope 8 are projected on an image sensor surface 13 of a camera 10.

Next, as lines that pass through the rope projection points $u_1$, $u_2$ and touch the outer diameter points $P_1$, $P_2$ of the rope, as indicated by formulas (1), (2), linear equations connecting the rope projection points $u_1$, $u_2$ and a focal point (0,0) are sought.

Next, sought are two perpendicular lines that are perpendicular to the lines indicated by formulas (1), (2) and pass through a rope center coordinate $P_0$.

Then, as indicated in the second equation and the third equation of formula (8), as lengths $d_1$, $d_2$ of the two perpendicular lines, respectively calculated are distances from the outer diameter points $P_1$, $P_2$ where the lines indicated by formulas (1), (2) touch the rope 8 to the rope center coordinate $P_0$; as indicated in the first equation in formula (8), a diameter D of the rope 8 is calculated with a sum of the lengths $d_1$, $d_2$ of the perpendicular lines.

Note that as illustrated in (c) in FIG. 5, a detected diameter value K of the rope 8 fluctuates in a constant amplitude according to an image shooting line.

Note that whereas patent literature 3, in order to calculate in advance conversion coefficients for each pixel, needs to reset the conversion coefficients in a situation where a distance between a camera and a rope fluctuates due to vibration or the like of the rope, such resetting of conversion coefficients is unnecessary in the present invention because applied is the principle of triangulation by a stereo method.

<Step S5: Rope Peak Portion Calculation>

As illustrated in (d) in FIG. 5, a rope peak portion is detected from the measured diameter value of the rope. That is, because the detected diameter value K of the rope 8 fluctuates in the constant amplitude according to the image shooting line, a rope peak portion L is sought by calculating a maximum value of a measurement result value of the rope diameter value K.

INDUSTRIAL APPLICABILITY

The wired-rope measuring device and method of the present invention have wide industrial applicability because they relate to a technique of measuring a diameter of a rope without contact and correct volumetric anamorphosis.

REFERENCE SIGNS LIST

1, 2, 10 Line-sensor camera (camera)
3, 4 Illumination
5 Analyzing device
6 Storage device
7 Elevator controller
8, 11, 12 Wired rope (rope)
13 Camera image sensor surface
51 Image recording unit
52 Image processing unit
53 Rope diameter calculation unit
81, 82 Shooting range
A Real space
B Camera space
a Image data
b Position signal
c Synchronization signal
d Camera center
F Focal length of camera
g, h Projected size
I Outer diameter of rope
J Edge of rope
K Diameter value of rope
L Rope peak portion
$P_0$ Rope center coordinate
$P_1$, $P_2$ Rope outer diameter point
$u_1$, $u_2$ Rope projection point

The invention claimed is:

1. A wired-rope measuring device, comprising: two cameras that shoot one or no less than two wired ropes from different directions; and
an analyzing device that analyzes image data that is an image shot by the two cameras; wherein
the analyzing device applies the principle of triangulation by a stereo method to the image data to seek coordinates of the wired rope relative to the cameras, and
volumetric anamorphosis is corrected when calculating a diameter of the wired rope based on the coordinates of the wired rope.

2. The wired-rope measuring device according to claim 1, further comprising: at least one illumination instrument that illuminates the wired rope.

3. The wired-rope measuring device according to claim 1 or 2, wherein the analyzing device corrects volumetric anamorphosis by
   seeking two projection points where an outer diameter of the wired rope is projected to an image sensor surface of the cameras,
   seeking two lines that pass through the projection points and a focal point of the cameras as lines touching the outer diameter of the wired rope,
   seeking two perpendicular lines that are perpendicular to the lines and pass through a center of the wired rope,
   calculating distances from points where the lines touch the outer diameter of the wired rope to the center of the wired rope as lengths of the perpendicular lines, and
   calculating the diameter of the wired rope with a sum of the lengths of the perpendicular lines.

4. A wired-rope measuring method, comprising the steps of: shooting by two cameras one or no less than two wired ropes from different directions;
   seeking coordinates of the wired rope relative to the cameras by the principle of triangulation by a stereo method by analyzing image data that is a shot image; and
   correcting volumetric anamorphosis when calculating a diameter of the wired rope based on the coordinates of the wired rope.

5. The wired-rope measuring method according to claim 4, wherein the wired rope is illuminated by at least one illumination instrument.

6. The wired-rope measuring method according to claim 4 or 5, wherein
   correcting volumetric anamorphosis is performed by
   seeking two projection points where an outer diameter of the wired rope is projected to an image sensor surface of the cameras,
   seeking two lines that pass through the projection points and a focal point of the cameras as lines touching the outer diameter of the wired rope,
   seeking two perpendicular lines that are perpendicular to the lines and pass through a center of the wired rope,
   calculating distances from points where the lines touch the outer diameter of the wired rope to the center of the wired rope as lengths of the perpendicular lines, and
   calculating the diameter of the wired rope with a sum of the lengths of the perpendicular lines.

* * * * *